(12) United States Patent
Heldenbrand et al.

(10) Patent No.: US 8,781,083 B2
(45) Date of Patent: Jul. 15, 2014

(54) PAUSING CALL PROCESSING TO ENABLE THE PLAYBACK OF INFORMATION

(75) Inventors: Rob W. Heldenbrand, Omaha, NE (US); Anders H. Askerup, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1924 days.

(21) Appl. No.: 11/657,845

(22) Filed: Jan. 25, 2007

(65) Prior Publication Data

US 2008/0181372 A1 Jul. 31, 2008

(51) Int. Cl.
*H04M 1/64* (2006.01)
(52) U.S. Cl.
USPC .................. 379/88.22; 379/207.16
(58) Field of Classification Search
CPC .. H04M 3/533; H04M 3/53333; H04M 3/493
USPC .............. 379/207.16, 219, 220.01, 229, 230, 379/251, 252, 257; 455/433, 432.3, 456.4, 455/401, 567
See application file for complete search history.

(56) References Cited

U.S. PATENT DOCUMENTS

| | | | | |
|---|---|---|---|---|
| 4,152,548 | A * | 5/1979 | Horiki | 370/371 |
| 6,259,905 | B1 * | 7/2001 | Berkowitz et al. | 455/401 |
| 6,393,118 | B1 * | 5/2002 | Bhusri | 379/219 |
| 6,775,375 | B1 * | 8/2004 | Bhusri | 379/221.08 |
| 6,980,637 | B2 * | 12/2005 | Bhusri | 379/220.01 |
| 7,010,112 | B2 * | 3/2006 | Lee et al. | 379/207.16 |
| 7,369,650 | B1 * | 5/2008 | Bhusri | 379/114.14 |
| 7,630,484 | B2 * | 12/2009 | Bhusri | 379/221.08 |
| 8,031,854 | B2 * | 10/2011 | Zampiello | 379/207.16 |
| 2006/0077990 | A1 | 4/2006 | Lee et al. | |
| 2006/0153355 | A1 * | 7/2006 | Wang et al. | 379/215.01 |
| 2006/0165059 | A1 | 7/2006 | Batni et al. | |
| 2006/0182247 | A1 | 8/2006 | Batni et al. | |
| 2007/0197213 | A1 * | 8/2007 | Weintraub et al. | 455/433 |
| 2007/0218877 | A1 * | 9/2007 | Mills | 455/414.1 |
| 2008/0192920 | A1 * | 8/2008 | Bhusri | 379/229 |
| 2011/0150203 | A1 * | 6/2011 | Stille et al. | 379/207.16 |
| 2011/0176669 | A1 * | 7/2011 | Seelig | 379/207.16 |
| 2011/0311037 | A1 * | 12/2011 | Zampiello | 379/207.16 |

FOREIGN PATENT DOCUMENTS

| | | |
|---|---|---|
| EP | 1 619 864 A1 | 1/2006 |
| EP | 1619864 A1 * | 1/2006 |
| KR | 2004105517 A | 12/2004 |
| WO | 2006006801 A1 | 1/2006 |

OTHER PUBLICATIONS

Written Opinion and International Search Report from co-pending PCT application No. PCT/US02/051771, dated Jun. 3, 2008.

* cited by examiner

*Primary Examiner* — Fan Tsang
*Assistant Examiner* — Van D Huynh

(57) ABSTRACT

Methods, computer readable media, and system embodiments are provided for call routing in communication networks. One method embodiment includes initiating a call processing process by receiving a call for a called party, sending a message to a home location register to initiate a call termination, arming a trigger for transferring the call processing process to a set of executable instructions that can use a variable delay to pause the call processing process to allow a color ringback tone server to provide an initial play of a ringback tone, initiating an initial play of the ringback tone for receipt by the calling party, sending a message transferring the call processing process to the home location register, and setting a variable delay that allows the initial play of the ringback tone to the calling party to play for a predetermined period.

20 Claims, 3 Drawing Sheets

PAUSING CALL PROCESSING TO ENABLE THE PLAYBACK OF INFORMATION

BACKGROUND

In the field of communications (e.g., telecommunications), individuals can subscribe to services offered by a number of different service providers. A service provider can provide services, such as mobile and/or fixed phone service and/or other communications service functionalities, through a telecommunications system. For example, an individual can subscribe to a particular communications service for their phone that is offered by a particular service provider.

With respect to communication device service providers, an individual often makes this decision based upon the features offered by the service provider and/or the service's compatibility with the individual's device that accesses the communications system.

A communications system can include various functions which can work together to provide services to subscribers. Within these are services that provide a ringtone, message, or other type of information that is provided during some portion of the communication processing that creates a communication link between users of the system.

In some systems, users can be subscribers and non-subscribers. For example, a user that is a non-subscriber may contact the system in order to communicate with a user that is a subscriber. In such instances, some functions of the systems being contacted may be compatible with the functionalities of the system to which the contacting party is a subscriber and some functions may not be compatible.

One service that can be provided by a communications system (e.g., a telecommunications system), sometimes referred to as color ringback tone (CRBT), allows a called party to play a message or ringtone for the calling party to hear while the communication device system is connecting the party's devices for communication. For example, the called party can play a message such as "Thank you for calling, your call is important to us, please stay on the line and our service staff will help you as soon as they are available."

However, some communication device systems have become so fast at setting up the call connections that the CRBT is cut short (e.g., before the entire message has played). In some systems, even with short ringback tones, the ringback tone can be cut off before it finishes. In some systems, this issue can be an annoyance or can provide an incoherent message to a listener.

DETAILED DESCRIPTION

Figure 1:
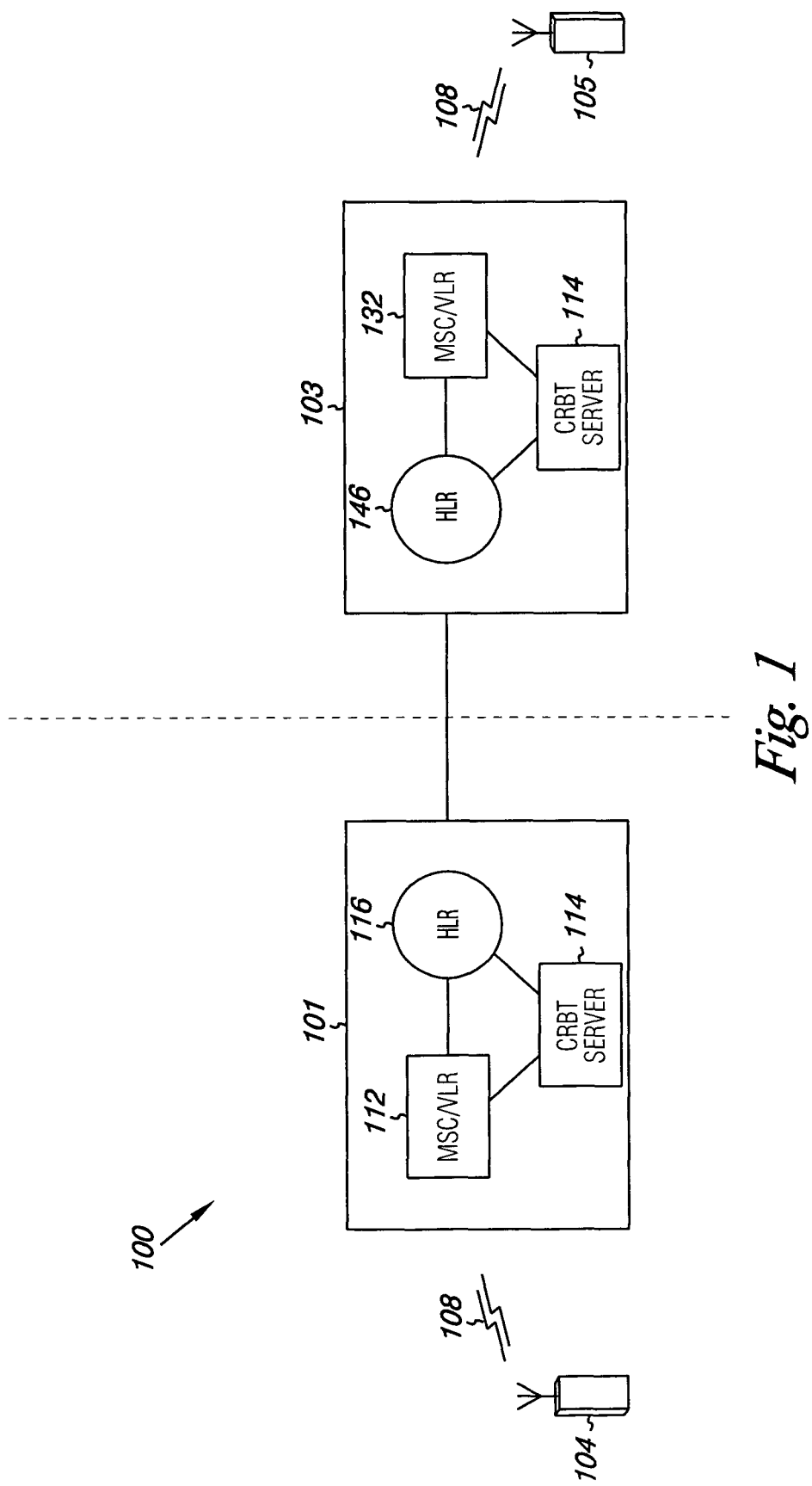
FIG. 1 is a block diagram illustrating an embodiment of a system including a serving network and a target network.

Embodiments of the present disclosure can be utilized to pause a communications processing function, such as a call processing function, in order to provide information, such as a ringtone or message to a user of the system, such as a calling and/or called party. For instance, as described above, color ringback tones (CRBT) can be used to allow a cellular subscriber to play personalized ringback tones to the person calling their number (i.e., the calling party).

Such ringback tones can, for instance, be musical or provide a recorded message that may be personal or business related. In some systems, the subscriber (i.e., the called party) can utilize the CRBT service for a fee.

By implementing a pause in call processing the information, such as a CRBT can be communicated to the calling party (e.g., the calling party can hear the ringback tone in its entirety). Such a pause can be accomplished in a variety of manners. For example, in some embodiments, a pause can be accomplished by using a trigger in a call processing system to transfer the call processing to an application that is capable of providing a delay before handing the call processing back to the call processing system.

For instance, such embodiments can provide the delay by using a variable or non-variable delay algorithm. Embodiments are also described herein where the delay is provided based upon knowledge regarding when the ringback tone or other information to be conveyed has completed one or more playbacks.

In some embodiments, the home location register (HLR) in the call processing system includes executable instructions (e.g., a software application having one or more executable instructions) to arm a trigger that transfers call processing to the application or to another application in a component of the communications system. The application can reside on various suitable components of the system. For example, in some embodiments, the application can be provided on the HLR or other service control point (SCP) component (e.g., a CRBT server).

In an embodiment utilizing a variable or non-variable delay, an originating mobile switching center (MSC) can be used to transfer call processing to an application in the call processing system that uses the delay to pause call processing and allows the play of the CRBT to complete before call processing resumes. In various embodiments, the delay can be set such that one playback of the information is accomplished. In some embodiments, more than one playback can be made.

A variable delay is one that can be changed depending upon the length of delay desired. The delay time can be based on various criteria. For example, the delay time can be based upon the length of the information to be conveyed, based upon an expected length of information to be conveyed, based upon a window of time allocated for a user for recording information, or can be based upon a measurement of the length of information that is to be played back.

The setting of the delay can be accomplished manually be a user of the system, or can be accomplished via executable instructions and data provided from a database, for example. Embodiments having a manual delay capability can, for example, be set by a system administrator that can set delay parameters for one or more devices used with the system and/or a user of a device accessing the system (e.g., a subscriber). For instance, the individual entering the delay parameter can select a time period (e.g., 3 seconds), for example, based upon a criterion provided above, some other suitable criterion, or arbitrarily.

In some embodiments, this parameter can be changed if the selected time period is not long enough or is too long. Additionally, in some embodiments, a system component may have a number of CRBTs or other messages or information already available that can be selected from. In such embodiments, the length of such selections may be known or measured and that length information can be used to determine the delay parameter to be entered.

Such available selections can be utilized in manual embodiments and/or embodiments that utilize executable instructions to enter the delay parameter. In executable instruction embodiments, a CRBT or other information can, for example, be selected and executable instructions can use the length information of the selection to set the delay parameters.

FIG. 1 is a block diagram illustrating an embodiment of a system including a serving network and a target network. FIG. 1 illustrates an embodiment of a connection between a requesting communication device 104 (e.g., a mobile station or "MS") and a target communication device 105 over the serving network 101 and the target network 103 within a communications system 100.

In the embodiment shown in FIG. 1, a requesting communication device 104 communicates, through a communications network infrastructure 101 acting as the serving network, with a target communication device having its own network infrastructure. In some instances, the two communication devices may be part of the same network and, therefore, only one network would be used and both devices may use the same MSC, HLR, and/or CRBT Server, among other components.

In the embodiment of FIG. 1, the system 100 includes a number of communication networks 101 and 103. Such networks can be designed to provide communication of one or more types of media (e.g., text, audio, and/or image media). In the embodiment of FIG. 1 the network 101 includes a mobile switching center/virtual location register 112, a CRBT server 114, and a home location register 116. The network 103 similarly includes a mobile switching center/virtual location register 132, a CRBT server 114, and a home location register 146.

The communication devices, servers, and other computing devices discussed herein, such as a computing device (e.g., server) or other network component in serving network 101/103, and/or communication device 104/105, can include one or more logic circuits (e.g., processors and/or application specific integrated circuits, etc.) and memory therein for the storing of executable instructions and the execution thereof by one or more of the logic circuits. Memory can include non-volatile and volatile memory such as Flash memory, Read Only Memory (ROM), and Random Access Memory (RAM), among others.

The communication devices that can be utilized can be fixed or mobile communication devices and can have several networks through which a communications session can take place. In FIG. 1, the networks shown are operable to be utilized as mobile networks and the structures of embodiments of these networks are described in detail below. However, the embodiments of the present disclosure are not limited to the structures shown.

In the serving network 101 of FIG. 1, a requesting communication device 104 can, for example, communicate with a mobile switching center (MSC) 112 through a base station having an antenna (not shown). Wireless telecommunications networks, such as the example shown in FIG. 1, include an MSC that is connected to a plurality of base stations that are dispersed throughout the geographic area serviced by the network.

The geographic area serviced by a wireless telecommunications network is typically partitioned into a number of spatially distinct areas called "cells." Each MSC is typically responsible for, among other things, establishing and maintaining calls between communication devices, such as between a communication device and a wireline terminal, which is connected to the system via local and/or long-distance networks.

An MSC can perform various functions, including for example, mobility management, call handoffs, call admission, call control, and/or resource allocation, among others. The call can then be relayed from the MSC to one or more base stations, such via wired or wireless communication, to the target communication device.

In FIG. 1, whenever a communication device, e.g. 104, activates or roams into a new MSC coverage area (i.e., the "cell" for which the MSC is responsible), the new MSC becomes the serving MSC 112. The communication device 104 transmits its stored identity to the new serving MSC via a base station. As shown in FIG. 1, the subscriber identity information can be transmitted over a radio channel 108 and detected by an antenna of a base station. The base station, in turn, can be used to transmit the subscriber identity information to the serving MSC 112.

As illustrated in the embodiment of FIG. 1, the MSC 112 can, in some embodiments, include Visiting Location Register (VLR) functionality. VLRs are used to track subscribers within the network that are roaming out of their cell serviced by their home location register (HLR) and are presently located within the cell of the network serviced by a particular VLR and its corresponding MSC. With respect to the present disclosure, a VLR can be viewed as being an MSC or an HLR.

An HLR is a database in a cellular system that contains information about the subscribers within the provider's home service area. An HLR can be a standalone device such as a server or the functionality of an HLR can be integrated into another network device, such as into an MSC or VLR effectively making the device a combined MSC/HLR or VLR/HLR device.

In order to provide mobile service to a registered (i.e., registered as a subscriber within the network) communication device 104, the serving MSC 112 can transmit a signal, such as a location update signal, to an HLR, such as HLR 116. The data in the HLR is requested and transferred to a VLR in the new area.

The transferred signal informs the HLR 116 of the network address associated with the MSC 112 currently serving the communication device 104 and also requests requisite subscriber information for providing mobile service to the roaming communication device 104. The HLR 116 updates its database to store the network address representing the serving MSC 112 and also copies the requested subscriber information to the VLR associated with the serving MSC 112. The network address representing the serving MSC 112 stored in the HLR 116 is later utilized by the mobile network to reroute any incoming call intended for the communication device 104 to the serving MSC 112.

Accordingly, whenever a telecommunications subscriber using a communication device 105 requests communication with another communication device 104 (e.g., dials a telephone number for the communication device), the HLR 116 is queried by the mobile network to determine the current location of the communication device 104. Utilizing information, such as a stored network address in HLR 116 representing the serving MSC 112, the HLR 116 can request contact information (e.g., a roaming number) from the serving MSC 112 in response to the receipt of the query signal.

The contact information provided by the serving MSC 112 can then be used by the telecommunications network to route the incoming signal toward the serving MSC 112. The serving MSC 112 can then page the communication device 104 and accordingly establishes a connection with the communication device 104, if available. If the communication device 104 roams out of serving MSC 112 coverage area and into another MSC coverage area, MSC 112 will hand-off the communication to the new MSC and its corresponding new base station.

Once this communication is established, it is possible to provide a color ringback tone (CRBT) in some instances. The CRBT can be audible (e.g., one or more sounds and/or music), visual (e.g., one or more still images and/or video), and/or text information that is provided to the calling party.

This CRBT information can, for example, be provided when the call is being set up within a network or between multiple networks. Such CRBTs can be provided to one or more calling parties at the same or similar time.

Embodiments of the present disclosure provide a CRBT functionality (e.g., via a CRBT server 114) that can be used to provide time for the use of ringback tones. This time can be provided in a number of ways. For example, a delay in call processing can be provided such that more of or the entire CRBT can be played or the call processing process can be handed off to a component monitoring the playback of the CRBT.

Although illustrated as a separate CRBT server component 114 of the networks 101 and 103, this functionality can be provided in one or more other types of network devices (e.g., can be provided as part of an MSC, VLR, and/or HLR, among other network devices) and does not have to be a separate component of the network. Examples of some communication flows are provided in the discussions of FIGS. 2 and 3 of the present disclosure.

As one of ordinary skill in the art will understand, the embodiments can be performed by software, application modules, and computer executable instructions operable on the systems and devices shown herein or otherwise. The embodiments of the present disclosure are not limited to any particular operating environment or to software written in a particular programming language. Software, application modules, and/or computer executable instructions, suitable for carrying out embodiments of the present disclosure, can be resident in one or more devices or locations or in several and even many locations.

Embodiments of the present disclosure can also reside on various forms of computer readable mediums. Those of ordinary skill in the art will understand that a computer readable medium can be any medium that contains information that is readable by a computer. Forms of computer readable mediums can, for example, include volatile and/or non-volatile memory stored on fixed or removable mediums, such as hard drives, disks, memory cards, and the like, among others.

Unless explicitly stated, the method embodiments described herein are not constrained to a particular order or sequence. Additionally, some of the described method embodiments or elements thereof can occur or be performed at the same point in time.

Figure 2:
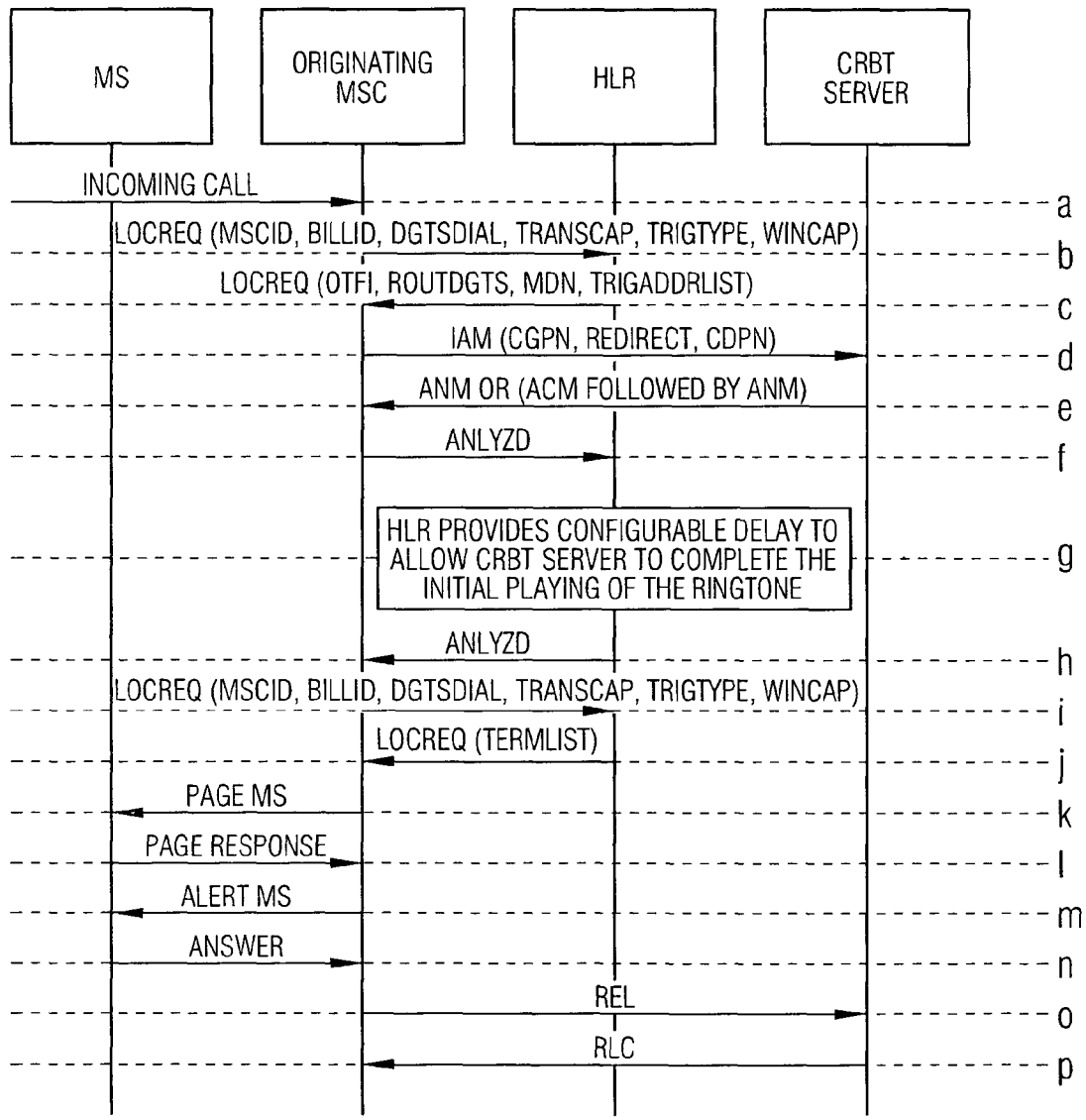
FIG. 2 is an example of a process flow of an embodiment of the present disclosure.
Figure 3:
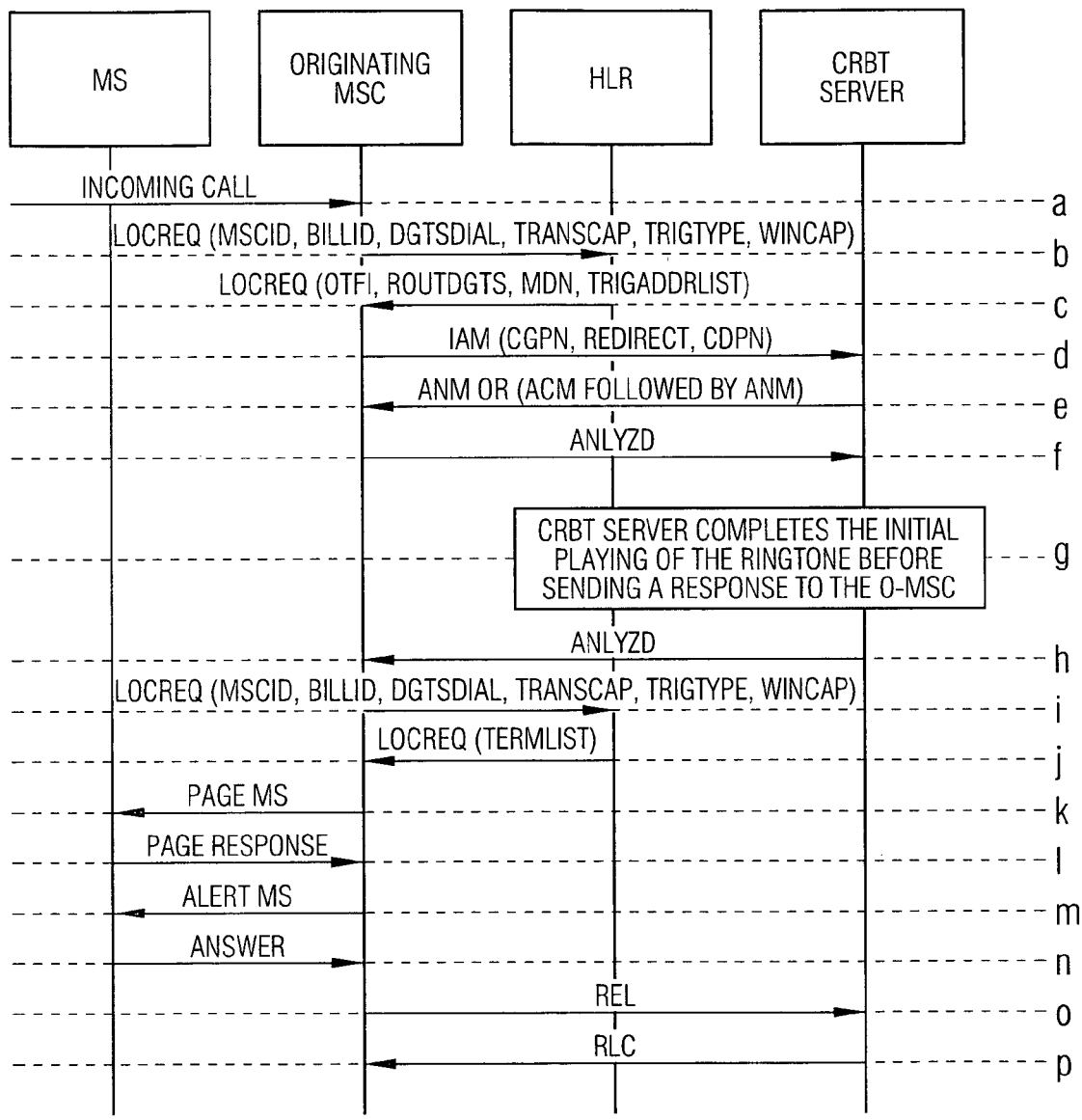
FIG. 3 is an example of a process flow of another embodiment of the present disclosure.

FIG. 2 is an example of a process flow of an embodiment of the present disclosure. Although the examples illustrated in FIGS. 2 and 3 are directed toward a telecommunications system, the embodiments of the present disclosure can be utilized in other types of communications systems. The embodiment of FIG. 2 utilizes the HLR to accomplish the delay functionality as will be discussed in more detail below.

In the embodiment illustrated in FIG. 2, a calling party (e.g., using communication device 104 of the embodiment of FIG. 1) can attempt to connect to a called party (e.g., using communication device 105 of the embodiment of FIG. 1), for example by dialing a called party's number, and a call can be initiated to the originating MSC (e.g., MSC/VLR 112 of the embodiment of FIG. 1), as indicated at a. The originating MSC can be used to send a message to the HLR (e.g., HLR 116 of the embodiment of FIG. 1) to initiate call termination, as provided at b.

The HLR can provide CRBT information to route the calling party call termination to the CRBT server and can arm a trigger to transfer call processing to an application that can use a delay to pause call processing to allow, for example, the CRBT server to complete a play of a ringback tone, as provided at c. In the embodiment illustrated in FIG. 2, the HLR is used to provide the delay. However, in some embodiments, other components of the system can provide this functionality.

The originating MSC can be utilized to route the calling party call termination to the CRBT server, as indicated at d. The CRBT server can begin playing the initial play of the ringback tone for the calling party, as illustrated at e. In such embodiments, the originating MSC can send a message transferring call processing to the HLR, as indicated at f in the embodiment of FIG. 2.

The HLR can be used to set a delay that allows the initial play of the ringback tone to the calling party to complete. In some embodiments, multiple ringback tones or multiple plays of the same ringback tone can be played and/or completed before the delay is completed. Such setting functionality is illustrated at g.

The HLR can respond, for example, when the delay is over, with a message transferring call processing back, for instance, to the originating MSC. This process is indicated at h.

The originating MSC can query the HLR for location and call delivery information, as indicated at i. In such embodiments, the HLR can respond with the requested location and call delivery information, as provided at j.

At this point, in some embodiments, the originating MSC can be used to page the called party's mobile station (MS), as indicated at k. The MS can respond to the page, as provided at l.

In the embodiment of FIG. 2, the originating MSC alerts the MS to an incoming call, indicated at m. The MS responds to the alert when the called party answers the communication device, as provided at n. The originating MSC can instruct the CRBT server to release the call, at o, and the calling party can be connected to the called party, as indicated at p.

FIG. 3 is an example of a process flow of another embodiment of the present disclosure. The embodiment of FIG. 3 provides a delay based upon knowledge regarding when the ringback tone has completed one or more playbacks. The embodiment of FIG. 3 also provides and embodiment where the originating MSC transfers call processing to the CRBT server in the call processing system which allows an initial play or number of plays of one or more CRBT items to play and/or complete before call processing resumes.

As with in the example embodiment provided in FIG. 2, in the embodiment illustrated in FIG. 3, the calling party can dial the called party's number and a call can be initiated to the originating MSC, as indicated at a. The originating MSC can be used to send a message to the HLR to initiate call termination, as provided at b.

The HLR can provide CRBT information to route the calling party call termination to the CRBT server and can arm a trigger to transfer call processing to an application that can use a delay to pause call processing to allow, for example, the CRBT server to complete a play of a ringback tone, as provided at c.

The originating MSC can be utilized to route the calling party call termination to the CRBT server, as indicated at d. As with the embodiment described in FIG. 2, the CRBT server can begin playing the initial play of the ringback tone for the calling party, as illustrated at e.

However, in the embodiment of FIG. 3, the originating MSC can send a message transferring call processing to the CRBT server, as indicated at f in the embodiment of FIG. 3. The CRBT server continues to play the ringback tone, as described at g. In such embodiments, the CRBT server can, for example, respond with a message transferring call processing back to the originating MSC after the play of the ringback tone has completed, as indicated at h.

As with the embodiment illustrated in FIG. 2, the originating MSC can query the HLR for location and call delivery information, as indicated at i. In such embodiments, the HLR can respond with the requested location and call delivery information, as provided at j.

At this point, in some embodiments, the originating MSC can be used to page the called party's mobile station (MS), as indicated at k. The MS can respond to the page, as provided at l.

In the embodiment of FIG. 3, the originating MSC alerts the MS to an incoming call, indicated at m. The MS responds to the alert when the called party answers the communication device, as provided at n. As with the example embodiment provided in FIG. 2, the originating MSC can instruct the CRBT server to release the call, at o, and the calling party can be connected to the called party, as indicated at p.

In such embodiments, a CRBT server can complete one or more plays of a CRBT before the calling party is connected to the called party. Such embodiments can also be useful, for example, with an automated system as the called party, such as a voicemail server. It should be noted that in such delay or call process transfer embodiments, various components can be used to handle such functionality and the description herein provides some examples of functionality locations, but should not be deemed limiting.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method comprising:
   initiating a call processing process by receiving a call for a called party;
   sending a message to a home location register to initiate a call termination;
   arming a trigger for transferring the call processing process to a set of executable instructions that sets a variable delay for a predetermined time period to pause the call processing process to allow a color ringback tone server to provide a complete initial playing of a ringback tone in its entirety;
   initiating an initial play of the ringback tone for receipt by a calling party;
   sending a message transferring the call processing process to the home location register; and
   setting the variable delay for the predetermined time period that allows the initial play of the ringback tone to the calling party to play for the predetermined time period such that the entire ringback tone is played.

2. The method of claim 1, where the method includes:
   initiating a message transferring the call processing process back to an originating mobile switching center when the delay is over;
   querying the home location register for location and call delivery information;
   providing the call delivery information;
   paging a mobile station of a called party;
   responding to the page;
   alerting the mobile station to the call;
   responding to the alert when the called party answers a phone;
   instructing the color ringback tone server to release the call; and
   connecting a calling party to the called party.

3. The method of claim 1, where setting a variable delay is accomplished by setting the delay based on a measured length of a color ringback tone.

4. The method of claim 1, where setting a variable delay is accomplished by setting the delay based on a predetermined delay value that is provided in memory.

5. The method of claim 1, where the method includes measuring a length of a color ringback tone and setting the variable delay based on the measured length of the color ringback tone.

6. The method of claim 1, where initiating a message transferring call processing back to an originating mobile switching center is accomplished by initiating a message transferring call processing back to the originating mobile switching center via the home location register when the delay is over.

7. The method of claim 1, where setting a variable delay that allows the initial play of the ringback tone to the calling party to play for a predetermined period is accomplished by setting a variable delay on the home location register.

8. The method of claim 1, where the method includes:
   querying the home location register for location and call delivery information via an originating mobile switching center;
   providing the call delivery information via the home location register;
   paging a mobile station of a called party via the originating mobile switching center;
   responding to the page via the mobile station;
   alerting the mobile station to an incoming call via the originating mobile switching center;
   responding to the alert when the called party answers a phone via the mobile station;

setting a variable delay that allows an initial play of the ringback tone to the calling party to play for a predetermined period such that the entire ringback tone is played;

instructing the color ringback tone server to release the call via the originating mobile switching center; and connecting the calling party to the called party.

9. A non-transitory computer readable medium, having instructions for causing a device to perform a method, comprising:

initiating a call processing process by receiving a call for a called party;

sending a message to a home location register to initiate a call termination;

arming a trigger for transferring the call processing process to a set of executable instructions that sets a variable delay for a predetermined time period to pause the call processing process to allow a color ringback tone server to provide a complete initial playing of a ringback tone in its entirety;

setting the variable delay for the predetermined time period that allows an initial play of the ringback tone to a calling party to play for the predetermined time period such that the ringback tone is played in its entirety;

initiating an initial play of the ringback tone for receipt by the calling party;

sending a message transferring the call processing process to the color ringback tone server; and sending a message transferring the call processing process back to an originating mobile switching center.

10. The non-transitory computer medium of claim 9, sending a message transferring the call processing process back to the originating mobile switching center is sent after the initial play of the ringback tone has been completed.

11. The non-transitory computer medium of claim 9, where the method includes:

querying the home location register for location and call delivery information;

providing the call delivery information;

paging a mobile station of a called party;

responding to the page;

alerting the mobile station that the call is incoming;

responding to the alert when the called party answers a phone;

instructing the color ringback tone server to release the call; and connecting a calling party to the called party.

12. The non-transitory computer medium of claim 9, sending a message transferring the call processing process to the color ringback tone server is sent before the initial play of the ringback tone has been initiated.

13. The non-transitory computer medium of claim 9, where the method includes selecting a color ringback tone for playing to a calling party.

14. The non-transitory computer medium of claim 9, where selecting a color ringback tone for playing to a calling party includes selecting a color ringback tone selected from a group of ringback tone types including;

a text ringback tone type;

an audible ringback tone type; and a visual ringback tone type.

15. A telecommunications network having a number of network devices in communication with each other including:

a mobile switching center device;

a home location register device;

a color ringback tone device;

a mobile station device; and a logic circuit and memory on at least one of the devices of the network; and instructions stored in the memory and executable by the logic circuit to:

initiate a call processing process by initiating a call to a called party;

send a message to a home location register to initiate a call termination;

provide a location within the color ringback tone device to route a calling party to a color ringback tone;

arm a trigger for transferring the call processing process to a set of executable instructions that sets a variable delay for a predetermined time period to pause the call processing process to allow a color ringback tone device to provide a complete initial playing of a ringback tone in its entirety;

route the calling party to the color ringback tone device;

initiate an initial play of the ringback tone for the calling party;

send a message transferring the call processing process to the home location register; and set the variable delay for the predetermined time period that allows the initial play of the ringback tone to the calling party to play for the predetermined time period such that the ringback tone is played in its entirety.

16. The network of claim 15, where the network includes a database in memory that includes a number of ringback tone selections and executable instructions for selecting a ringback tone from the number of selections.

17. The network of claim 16, where the database includes ringback tone length information and executable instructions for selecting the variable delay based upon the ringback tone length information.

18. The network of claim 15, where the network includes a database in memory that includes a number of delay length values and executable instructions for selecting value for the variable delay from the number of delay length values.

19. The network of claim 15, where the network includes executable instructions for entering a delay value via a user interface.

20. The network of claim 15, where the trigger is provided by one or more executable instructions.

* * * * *

UNITED STATES PATENT AND TRADEMARK OFFICE
CERTIFICATE OF CORRECTION

PATENT NO.        : 8,781,083 B2
APPLICATION NO.   : 11/657845
DATED             : July 15, 2014
INVENTOR(S)       : Heldenbrand et al.

Page 1 of 1

It is certified that error appears in the above-identified patent and that said Letters Patent is hereby corrected as shown below:

In the Claims

Column 9, line 31, Claim 10, after "computer" insert -- readable --.

Column 9, line 35, Claim 11, after "computer" insert -- readable --.

Column 9, line 48, Claim 12, after "computer" insert -- readable --.

Column 9, line 52, Claim 13, after "computer" insert -- readable --.

Column 9, line 55, Claim 14, after "computer" insert -- readable --.

Signed and Sealed this
Twenty-seventh Day of January, 2015

Michelle K. Lee
*Deputy Director of the United States Patent and Trademark Office*